his
UNITED STATES PATENT OFFICE.

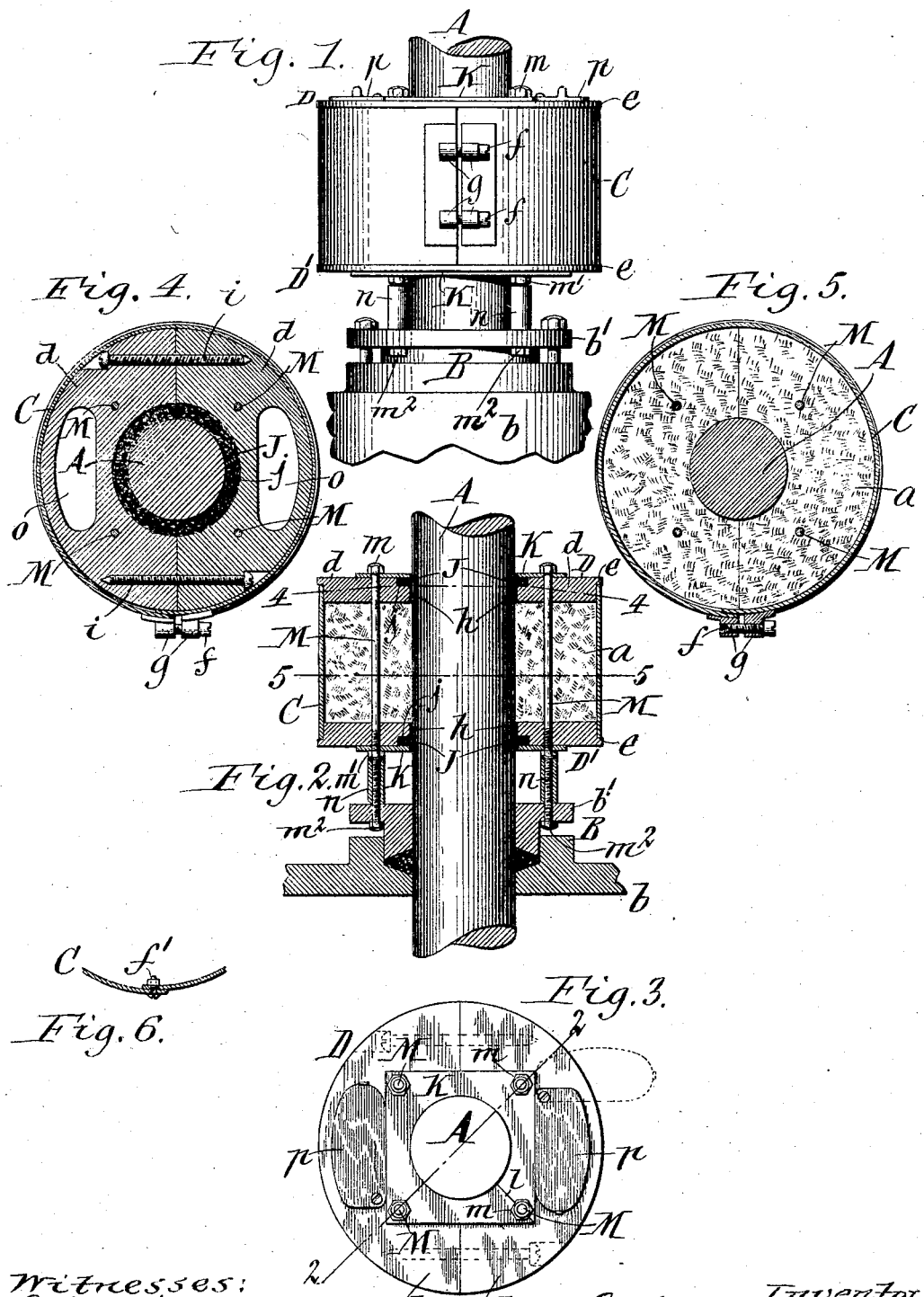

EMMETT G. HAGADORN, OF BUFFALO, NEW YORK, ASSIGNOR OF ONE-HALF TO HARRY D. HAGADORN, OF OLEAN, NEW YORK.

PISTON-ROD LUBRICATOR.

No. 872,622.　　　　Specification of Letters Patent.　　　　Patented Dec. 3, 1907.

Application filed June 26, 1907. Serial No. 380,851.

*To all whom it may concern:*

Be it known that I, EMMETT G. HAGADORN, a citizen of the United States, and resident of Buffalo, in the county of Erie and State of New York, have invented a new and useful Improvement in Piston-Rod Lubricators, of which the following is a specification.

This invention relates to a piston rod lubricator and has the objects to provide a lubricator for this purpose which is simple and inexpensive in construction, which can be applied to or removed from the piston rod without disturbing the rod or the parts with which it is connected; which can be filled without stopping the working of the rod, which effects perfect lubrication of the rod and keeps the same clean, which requires a minimum amount of lubricant, which avoids the liability of grit or dirt getting into the lubricant, and which possesses other advantages to be hereafter more fully explained.

In the accompanying drawings: Figure 1 is a side elevation of my improved lubricator showing the same applied to a piston rod and the stuffing box of a cylinder through which the rod slides. Fig. 2 is a vertical longitudinal section of the same, taken in line 2—2, Fig. 3. Fig. 3 is a top plan view thereof. Figs. 4 and 5 are horizontal sections in the correspondingly numbered lines in Fig. 2. Fig. 6 is a fragmentary section showing a modification of the means for connecting the ends of the split body of the lubricator.

Similar letters of reference indicate corresponding parts throughout the several views.

A represents the piston rod to which my improved lubricator is applied and which slides through a stuffing box B arranged on the head of the cylinder *b* containing the piston to which the rod is attached.

The receptacle which holds the lubricating medium *a* consists generally of a cylindrical body C and two circular heads or disks D, $D^1$ applied to the upper and lower ends of the body. The body of the receptacle preferably consists of sheet metal and engages at opposite ends of its bore with the periphery of said heads and bears at its opposite edges against shoulders *e* formed on these heads at the outer marginal corners thereof. This sheet metal body is split lengthwise on one side and the opposing ends or extremities of the body overlap each other so as to form a joint between the same. Any suitable means may be provided for holding the body against said heads and connecting the opposing ends thereof. One of the means for this purpose shown in Figs. 1, 4 and 5 consists of clamping screws *f* which connect lugs *g* applied to the extremities of the body. Upon tightening these screws the body is drawn tightly around both heads and the opposing ends of the same are held tightly together, thereby forming practically tight joints between these parts for confining the lubricating medium within the receptacle.

If desired the connection between the opposing ends of the body may be effected by a bolt $f^1$ passing transversely through the same, as shown in Fig. 6.

Any suitable lubricating agent or medium may be applied to the rod by my improved lubricator but I prefer for this purpose a mixture of grease and yarn. Each of the heads is divided diametrically into two sections *d, d* the opposing inner edges of which are provided with segmental recesses *h* forming together a circular opening through which the piston rod passes.

Various means may be employed for connecting the sections of each head on opposite sides of the piston rod the means for this purpose shown in the drawings consisting of screws *i* which extend transversely through the sections and across the joint between the same.

The outer portion of the bore of the central opening of each head is enlarged to form a circular rabbet *j* which receives a packing ring J of braided hemp or other suitable material. This ring fits tightly around the piston rod so as to prevent the lubricating agent within the receptacle from escaping therefrom and also to prevent external dirt and grit from entering the receptacle and becoming mixed with the lubricant. Each of the packing rings is held in its respective rabbet or seat by means of a retaining plate K bearing against the outer side of the packing ring and the adjacent head and provided with a central opening through which the piston rod passes. Each of these retaining plates is split on one side, as shown at *l*, Fig. 3, to permit passing the same around the piston rod, this being possible by springing the opposing ends of the retaining plate a suitable distance apart for this purpose.

M represents a plurality of longitudinal tie bolts which operate to hold the heads of the receptacle against opposite ends of the body, also to hold the retaining plates against the outer sides of the heads and packing rings and also to connect the lubricator with the stuffing box or other stationary support for holding the lubricator against movement with the piston rod. Four of these tie rods are shown in the drawings arranged equidistant around the rod and parallel therewith and passing through the heads of the receptacle within the body thereof through the marginal portions of the retaining plates and through the flange $b^1$ of the gland forming part of the stuffing box. Each of these tie rods is provided with upper and intermediate screw nuts $m$, $m^1$ bearing against the outer sides of the retaining plates and with a lower screw nut $m^2$ bearing against the underside or back of the gland flange $b^1$. Spacing sleeves $n$ are arranged around the tie rods between the upper or front side of the flange $b^1$ and the intermediate screw nuts $m^1$ adjacent to the lower retaining plates. These sleeves operate to hold the lubricator at the required distance from the stuffing box. Upon moving the nuts $m^1$, $m^2$ toward each other on the tie rods the spacing sleeves are clamped between the same and upon moving the upper nuts $m$ downwardly on the tie rods the retaining plates are clamped against the outer sides of the heads and the latter are firmly drawn against opposite edges of the body.

For the sake of securing greater stability the split or joint in each retaining plate is arranged out of line with the joint between the sections of the adjacent head, as shown in Fig. 3. To simplify the construction, one of the tie bolts passes through the joints between the retaining plates and its upper and intermediate nuts $m$, $m^1$ overlap both of its opposing ends, the upper nut $m$ being shown in Fig. 3 in this relation.

The openings in the retaining plates and the heads of the receptacle are preferably a trifle larger in diameter than the periphery of the piston rod so that only the packing rings bear against said rod, thereby preventing the latter from being scored or marked and preserving the same perfectly bright and smooth. In this condition the wear of the piston rod on the packing in the lubricator and in the stuffing box is reduced to a minimum, thereby reducing the amount of time required for keeping these parts in order and effecting a saving in repairs.

The upper head of the receptacle is provided with one or more openings $o$ through which the lubricating material is introduced into the receptacle to make up for that which is worn away or used up. These openings are normally closed by swinging gates, shutters or covers $p$ for excluding dirt and grit from the lubricant.

By making the body, heads and retaining plates separable in the manner described my improved lubricator can be freely applied to piston rods without disturbing the same or the parts with which they coöperate.

Inasmuch as the lubricator is wholly separate from the stuffing box, it is not under pressure, consequently the packing rings need to bear but lightly against the piston rod to prevent the escape of an undue amount of lubricant, thereby reducing the friction on the rod to a minimum and also avoiding the loss of power which would otherwise occur. Inasmuch as the lubricant is confined in the receptacle there can be no slopping or wasting of the same and as the lubricant comes in contact with the packing rings the same are kept in perfect order, wear longer and require less attention.

I claim as my invention:

1. A piston rod lubricator comprising a receptacle adapted to contain a lubricating medium and having two heads each of which is split to permit of applying the same laterally to said rod, and a split body engaging with both of said heads, substantially as set forth.

2. A piston rod lubricator comprising a receptacle adapted to contain a lubricating medium and having two heads each divided into two sections which are adapted to embrace opposite sides of the piston, and a split body adapted to engage with the outer edges of said heads, substantially as set forth.

3. A piston rod lubricator comprising a receptacle adapted to contain a lubricating medium and having two heads each divided into two sections which are adapted to embrace opposite sides of the piston, a split body adapted to engage with the outer edges of said heads, and means for detachably connecting the opposing ends of said body, substantially as set forth.

4. A piston rod lubricator comprising a receptacle adapted to contain a lubricating medium and having circular heads each divided diametrically into two sections and said sections having a circular opening between them through which the piston rod is adapted to pass, a split cylindrical body engaging at its opposite ends with said heads, and means for connecting the opposing ends of said body, substantially as set forth.

5. A piston rod lubricator comprising a receptacle adapted to contain a lubricating medium and having circular heads each divided diametrically into two sections and said sections having a circular opening between them through which the piston rod is adapted to pass, a split cylindrical body engaging at its opposite ends with said heads, and screws connecting the sections of each head, substantially as set forth.

6. A piston rod lubricator comprising a receptacle adapted to contain a lubricating medium and having circular heads each divided diametrically into two sections and said sections having a circular opening between them through which the piston rod is adapted to pass, a split cylindrical body engaging at its opposite ends with said heads and having its opposing ends one overlapping the other, and means for connecting said ends of the body, substantially as set forth.

7. A piston rod lubricator comprising a receptacle adapted to contain a lubricating medium and having circular heads each divided diametrically into two sections and said sections having a circular opening between them through which the piston rod is adapted to pass, a split cylindrical body engaging at its opposite ends with said heads and having its opposing ends one overlapping the other, and clamping screws passing through lugs on said ends of the body, substantially as set forth.

8. A piston rod lubricator comprising a receptacle adapted to contain a lubricating medium and having circular sectional heads provided with peripheral shoulders and with central openings through which the piston rod is adapted to pass and a split cylindrical body engaging its opposite ends with said shoulders, substantially as set forth.

9. A piston rod lubricator comprising a receptacle adapted to contain a lubricating medium and having circular sectional heads provided with peripheral shoulders and with central openings through which the piston rod is adapted to pass, a split cylindrical body engaging its opposite ends with said shoulders, and means for connecting said heads, substantially as set forth.

10. A piston rod lubricator comprising a receptacle adapted to contain a lubricating medium and having circular heads provided with peripheral shoulders and with central openings through which the piston rod is adapted to pass, a cylindrical body engaging its opposite ends with said shoulders, and tie rods connecting said heads within the body, substantially as set forth.

11. A piston rod lubricator comprising a receptacle adapted to contain a lubricating medium and having two sectional heads provided with openings through which the piston is adapted to pass, packing rings arranged in the bore of said openings and adapted to engage said piston rod, and a split body engaging with the periphery of said heads, substantially as set forth.

12. A piston rod lubricator comprising a receptacle adapted to contain a lubricating medium and having two heads provided with openings through which the piston is adapted to pass, and with a rabbet in the outer part of the bore of each of said openings, a packing ring arranged in each of said rabbets, and split retaining plates engaging with the outer sides of said rings and secured to the respective heads, substantially as set forth.

13. A piston rod lubricator comprising a receptacle adapted to contain a lubricating medium and having two heads provided with openings through which the piston is adapted to pass and with a rabbet in the outer part of the bore of each of said openings, a packing ring arranged in each of said rabbets, retaining plates engaging with the outer sides of said rings, and tie bolts passing through said plates and heads, substantially as set forth.

14. A piston rod lubricator comprising a receptacle adapted to contain a lubricating medium and having heads divided into sections, said sections having recesses in their opposing edges forming openings through which the piston rod passes, a split body engaging with the periphery of said heads, packing rings arranged in said openings and adapted to engage said piston, retaining plates engaging with said rings and having a split which is arranged out of line with the joint between the head sections, and means for connecting the heads and retaining plates, substantially as set forth.

15. A piston rod lubricator comprising a receptacle adapted to contain a lubricating medium and having heads divided into sections, said sections having recesses in their opposing edges forming openings through which the piston rod passes, a split body engaging with the periphery of said heads, packing rings arranged in said openings and adapted to engage said piston, retaining plates engaging with said rings and having a split which is arranged out of line with the joint between the head sections, tie rods passing through said heads and plates within the body and one of said rods passing between the split of said plates, and nuts applied to said rods and bearing against the outer sides of said plates, substantially as set forth.

16. A piston rod lubricator comprising a receptacle adapted to contain a lubricating medium and having heads provided with openings through which the piston rod is adapted to pass, a body engaging with said heads, and means for connecting said receptacle with a stationary part, consisting of tie rods passing through said heads and stationary part, and spacing sleeves surrounding said rods between said receptacle and said stationary part, substantially as set forth.

Witness my hand this 25th day of June, 1907.

EMMETT G. HAGADORN.

Witnesses:
  THEO. L. POPP,
  ANNA HEIGIS.